(12) United States Patent
Middelman

(10) Patent No.: US 9,017,891 B2
(45) Date of Patent: Apr. 28, 2015

(54) HYDROGEN FED POWER SYSTEM AND METHOD FOR GENERATING POWER

(75) Inventors: Erik Middelman, Arnhem (NL); Marleen Middelman-Koornneef, legal representative, Arnhem (NL)

(73) Assignee: HyET Holding B.V., Arnheim (NL)

(*) Notice: Subject to any disclaimer, the term of this patent is extended or adjusted under 35 U.S.C. 154(b) by 480 days.

(21) Appl. No.: 13/201,204

(22) PCT Filed: Feb. 10, 2010

(86) PCT No.: PCT/NL2010/050063
§ 371 (c)(1),
(2), (4) Date: Jan. 9, 2012

(87) PCT Pub. No.: WO2010/093240
PCT Pub. Date: Aug. 19, 2010

(65) Prior Publication Data
US 2012/0135329 A1    May 31, 2012

(30) Foreign Application Priority Data
Feb. 16, 2009 (EP) .................................... 09152913

(51) Int. Cl.
*H01M 8/04* (2006.01)
*H01M 6/26* (2006.01)
(Continued)

(52) U.S. Cl.
CPC ............ *H01M 6/26* (2013.01); *H01M 8/04007* (2013.01); *H01M 8/04201* (2013.01); *H01M 8/0656* (2013.01); *H01M 16/006* (2013.01); *Y02E 60/366* (2013.01); *Y02E 60/50* (2013.01)

(58) Field of Classification Search
USPC ......................................... 429/446, 434, 443
See application file for complete search history.

(56) References Cited

U.S. PATENT DOCUMENTS

| | | | | |
|---|---|---|---|---|
| 4,686,157 A | * | 8/1987 | Miyake et al. ................. | 429/416 |
| 2004/0028965 A1 | * | 2/2004 | McElroy et al. ................ | 429/21 |
| 2004/0081872 A1 | * | 4/2004 | Herman et al. ................. | 429/26 |

(Continued)

FOREIGN PATENT DOCUMENTS

| | | |
|---|---|---|
| EP | 0562724 A | 9/1993 |
| WO | 03021006 A | 3/2003 |
| WO | 03075379 A | 9/2003 |

OTHER PUBLICATIONS

International Search Report Dated Jul. 23, 2010, for International Patent Application No. PCT/NL2010/050063.

(Continued)

*Primary Examiner* — Stewart Fraser
*Assistant Examiner* — Olatunji Godo
(74) *Attorney, Agent, or Firm* — Constellation Law Group PLLC; Joshua King

(57) ABSTRACT

The present invention relates to a hydrogen fed power system comprising: a high-pressure hydrogen container (150), at least one hydrogen driven energy converter such as a fuel cell (159) connecting to the hydrogen container (150), pressure converter (158) for hydrogen gas, located between the high-pressure hydrogen container (150) and the lower pressure energy converter (159). The invention also relates to a vehicle as well as to a stand-alone electric power unit provided with such an hydrogen fed power system. Furthermore the present invention relates a method for use of the hydrogen fed power system and to a method for filling up the high-pressure hydrogen container of the hydrogen fed power system.

14 Claims, 11 Drawing Sheets

(51) Int. Cl.
*H01M 8/06* (2006.01)
*H01M 16/00* (2006.01)

(56) References Cited

U.S. PATENT DOCUMENTS

2005/0077172 A1  4/2005  Wachi et al.

2007/0044663 A1  3/2007  Song et al.

OTHER PUBLICATIONS

European Search Report Dated Jun. 26, 2009, for European Patent Application No. EP 09152913.

* cited by examiner

… (US 9,017,891 B2)

HYDROGEN FED POWER SYSTEM AND METHOD FOR GENERATING POWER

PRIORITY CLAIM

The present application is a national phase application filed pursuant to 35 USC §371 of International Patent Application No. PCT/NL2010/050063, filed 10 Feb. 2010; which application claims the benefit of European Patent Application No. 09152913.1, filed 16 Feb. 2009; all of the foregoing applications are incorporated herein by reference in their entireties.

TECHNICAL FIELD

Embodiments of the present invention relate to a hydrogen fed power system comprising: a high-pressure hydrogen container, at least one hydrogen driven energy converter connecting to the hydrogen container, a pressure converter for hydrogen gas, located between the high-pressure hydrogen container and the lower pressure energy converter. Embodiments of the present invention also relate to a vehicle as well as to a stand-alone electric power unit provided with such a hydrogen fed power system. Furthermore, embodiments of the present invention relate to a method for use of the hydrogen fed power system and to a method for filling up the high-pressure hydrogen container of the hydrogen fed power system.

BACKGROUND

The field of pressurised hydrogen technology including a hydrogen transfer membrane is used in hydrogen fed power systems. Due to the fact that hydrogen fed power systems are normally operated with hydrogen that originates from a hydrogen container and the low volumetric energy density of gaseous hydrogen, hydrogen is normally compressed and stored at high pressures, typically at a value of about 20 MPa, of about 35 MPa or even of about 70 MPa and higher. Alternatively, hydrogen can be liquefied. Both compression and liquefaction of hydrogen require substantial energy. The energy for compression or liquefaction reduces the total energy efficiency of a hydrogen fed power systems (in automotive applications also referred to as; "well-to-wheel efficiency"). Recovery of this compression energy or liquefaction energy has been attempted in several ways. Hydrogen circulation can be accomplished using ejectors. These ejectors partially use the kinetic energy of a high pressure, high speed hydrogen gas stream. Such ejectors save energy that would otherwise be consumed by mechanical circulation pumps, however only a fraction of the invested compression energy is recovered this way. Alternatively a piston pump, a turbine or mechanical membrane pump can be used as de-compressor (expander) for the high pressure hydrogen. In this way a substantial part of the energy can be recovered. However, mechanical de-compressors like piston or reverse membrane pumps are noisy, expensive, heavy, bulky and require regular maintenance, and are therefore not very attractive.

It is an object of embodiments of the invention to improve the overall energy efficiency of hydrogen fed power systems preventing the above mentioned disadvantages of the prior art systems.

SUMMARY

Embodiments of the present invention provide an introductorily stated type hydrogen fed power system wherein the pressure converter for hydrogen gas has an ion-conductive membrane, and which system is also provided with a heat guide connecting the energy converter to the pressure converter. Not only efficient use can be made of hydrogen decompression with such a power system but the efficiency is even further enhanced by recycling available thermal energy. For a better understanding of embodiments of the invention in the following some further information will be provided on the ion-conductive membrane as well as to the recycling of available thermal energy in the power system.

The pressure converter can act as a de-compressor that generates electrical power by decompression of the hydrogen gas. Such generated power can be used for electric energy consumption and/or storage, e.g. in a battery pack. However the pressure converter may also be applicable as an electrically driven compressor. For such operation the pressure converter may be provided with a connection for external electric power supply. The power system of the present invention may also work as a dual system wherein the pressure converter provides in time both functions+ decompression and compression of hydrogen. The working of the system will be elucidated further down in the description.

The membrane can be incorporated in a decompression cell comprising a plurality of chambers including at least one high-pressure chamber and at least one low-pressure chamber separated from at least one of the high pressure chambers by the ion-conductive membrane. The ion-conductive membrane normally has a first surface in one of the high pressure chamber and a second surface in one of the low pressure chambers, the first surface being provided with a first electrode, and the second surface being provided with a second electrode, the first and second electrodes being electro conductively connected via an external electric circuitry. In this context, the word external means that the electric circuitry does not run through the membrane itself The ion-conductive membrane can for example fully enclose one of the high pressure or low pressure chambers. To this end, the proton conductive membrane can for example be planar or tubular.

The proton conductive membranes can also comprise a hydrogen permeable support layer. The support structure can for example overlay the second electrode, and can comprise—starting from the side of the second electrode—one or more hydrogen permeable layers and a mechanically rigid layer, which is sufficiently rigid to withstand the pressure difference between the high pressure side and the low pressure side of the membrane. The support layer should be made of electro conductive and thermally conductive materials with pores enabling hydrogen transmigration.

In decompression operation, the hydrogen gas at the high-pressure side of the membrane is ionised at the first electrode or anode forming protons and electrons. The protons diffuse through the proton conductive membrane, while electrons flow through the electric circuitry from the anode to the cathode, therewith generating a current. At the cathode, protons and electrons recombine to form molecular hydrogen $H_2$. This way pressure energy is converted into electric energy in a so called ionic decompression cell. This way, the present invention allows the utilisation of the hydrogen decompression energy in an efficient manner without the need for bulky apparatus.

Within the context of the present specification, a proton conductive layer is a layer with a proton conductivity of at least 0.01 S/cm. An electrically insulating layer is a layer with an electric break down strength of at least 10 kV/mm. The electrodes have an electric and proton conductivity sufficiently high to have acceptable electric Ohmic losses. To this end electrodes may be used with sufficiently high specific conductivity, and optimized thickness. Optionally, an electrode can be used comprising an electro-conductive catalytic material in combination with an electro-conductive catalytically inactive material. The catalytic material will ensure the conversion of molecular hydrogen into protons and electrons, and the electro-conductive material ensures transport of the electrons. In another possible embodiment, the in-plane electro-conductivity of the anode can be further improved by providing a highly conductive current distribution grid on top of the anode.

At the first electrode, the anode, present on the surface of the membrane on the high-pressure side, hydrogen is converted into protons and electrons (hydrogen oxidation reaction). The first electrode is an electrically conductive layer comprising a material which is able to catalyse the conversion of hydrogen into protons and electrons. Suitable catalysts are all known hydrogen ionising catalysts like platinum, palladium and other noble metals and alloys thereof. Also non-noble metals and transition metal oxides known to be catalytically active toward hydrogen ionisation can be used. In one embodiment, the electrode comprises a thin film of palladium or palladium alloy. Preferably, the first electrode comprises a thin film that has limited permeability for molecular hydrogen ($H_2$), but is conductive for protons. The first electrode will generally have a thickness of 0.2 to 5 microns, more in particular of 0.5 to 1 microns.

The protons are transferred to the second electrode, through the proton conductive and electrically insulating layer of the membrane. A membrane layer which is sufficiently non-permeable for hydrogen ($H_2$) is for example a layer with an $H_2$-permeability of less than 50% of the proton conductivity of the same membrane layer, the percentage being calculated by weight.

Materials suitable for manufacturing proton conductive electrically insulating membranes are known in the art, such as US 2004/0028965 and US 2007/0044663. The membrane may be of an inorganic and/or organic material, with organic materials generally being plastics. Suitable membranes encompass ceramic membranes, such as perovskite membranes like for example $KH(PO_3H)$—$SiO_2$ composites. Suitable plastic membranes encompass sulphonated polystyrene, sulphonated polyphenylene ethers, for example sulphonated polyphenyl ethers, or PPEs, and polyphenylene oxides, or PPOs. Copolymers of etheensulfonic acid, for example with styrene, vinyl chloride, and ethene may also be used, as may be sulphated polymers (sulphate esters) of for example, polyvinyl alcohol, or more in general sulphated hydroxyfunctional polymers, sulphonated aromatic polyamides and polyimides, and, more in general, sulphonic acid functional condensation polymers. Further suitable polymers include complexes of basic polymers with strong (in)organic acids, for example, polyvinyl pyridine, polyethylene imine, polyimidazoles, including polyvinyl imidazole, and diallylammonium-polymers. Examples of inorganic acids include phosphoric acid polyphosphoric acid and sulfonic acids.

When used in the presence of water, examples of suitable polymers include fluorinated sulfonic acid polymer (PFSA), sulfonated polyethersulfone (SPES) polymers, sulfonated poly(ether ether ketone) (SPEEK) polymer, sulphonated polyether ketone (SPEK), sulfonated poly(ether ketone ketone) (SPEKK), and sulfonated poly(arylene ether sulfone) (SPSU). With the proton conductive materials of this group water can be used to enhance their proton conductivity.

The proton conductive membrane generally has a thickness of 25 to 1000 microns, more in particular of 50 to 500 microns. The membrane may for example have a proton conductivity of at least 0.01 S/cm, e.g., at least 0.05 S/cm.

At the second electrode, the cathode, present on the surface of the membrane in the low-pressure side, the protons coming through the membrane react with electrons from the second electrode to form molecular hydrogen (hydrogen reduction reaction). The second electrode is an electrically conductive layer comprising a material which is able to catalyse the conversion of protons and electrons into molecular hydrogen. Suitable catalysts are known in the art and comprise, for example, platinum, palladium, other platinum group metals, and some palladium alloys. Also non-noble metals and transition metal oxides known to be catalytically active can be applied. Preferably, the second electrode is an electrically conductive layer that is permeable for molecular hydrogen and protons, e.g., by virtue of having aporous structure, resistant to pressures of 100 MPa or more, e.g. 200 MPa or more. The second electrode generally will have a thickness of 1 to 200 microns, more in particular of 2 to 10 microns. In the present specification, the combination of membrane and electrodes will be indicated as membrane electrode assembly. The membrane electrode assembly should be able to withstand the pressure differences between the high pressure side and the low-pressure side of the membrane. Depending on the nature of the membrane it may be necessary to provide a support structure in the membrane electrode assembly. This can, for example, be in the form of a porous support structure at the low pressure side of the membrane. The support structure should be able to withstand the pressure difference between the low pressure side of the membrane and the high pressure side of the membrane. This pressure difference can be as high as 200 MPa, but is more typically 80 MPa. In general, the pressure difference between one side of the membrane and the other is at least 1 MPa, in particular in the range of 1-200 MPa, more in particular in the range of 60-90 MPa.

The present invention also pertains to a membrane electrode assembly of this structure. In one embodiment, the porous support structure is a layered structure, adjacent to the membrane in the low pressure chamber, which comprises, starting from the electrode side, a porous $H_2$-permeable layer with pores of less than 1 micron, a porous $H_2$-permeable layer with pores with a diameter in the range of 1-100 microns, and a mechanically rigid layer. This structure can for example be obtained as follows: in a first step a macro-porous layer is provided with high gas permeability and sufficient mechanical strength. Suitable materials are for example sintered metal powders like bronze, copper, nickel, stainless steel, titanium, or aluminium. On top of this macro-porous layer a micro porous layer is provided having sufficient mechanical strength and sufficient gas permeability in the direction perpendicular to the surface. The pores in the micro-porous layer are typically <1 micron. On top of this micro porous support layer a porous electrode layer is applied. This porous electrode layer contains a suitable catalyst, is proton conductive, and electro-conductive. A suitable material is a micro porous palladium layer or a layer of a palladium alloy, such as a palladium rhodium alloy. The thickness of this cathode layer is typically a few microns.

Optionally, the low-pressure chamber comprises a water inlet, preferably with means for circulating water. Water can improve the proton conductivity of the membrane and the electrodes.

In general, the membrane electrode assembly has an optimum temperature for its proton permeability. It may be preferred to keep the temperature of the membrane electrode assembly within 50° C. from the optimum temperature. Normal optimal temperatures for ion-conductive membranes range from 50° C. to 200° C., more specific 100° C.-150° C.

During decompression according the present invention heat is to be fed to the ion-conductive membrane (the ionic decompression cell) to compensate for heat loss caused by the pressure reduction. Temperature may be controlled in dependency on the process conditions and composition of the Ohmic losses in the membrane that generate some heat, but are for most process conditions insufficient to maintain constant temperature at temperature levels as mentioned before. Lower temperature typically increases Ohmic losses, and reduces the power that can be generated by the ionic decompression. Heat generated in the energy converter of the hydrogen fed power system is transported by the heat guide to the ion-conductive membrane and thus to optimise the performance of the membrane. By using redundant thermal energy of an hydrogen operated energy converter less heat has to be actively discharged, adding to the overall power system efficiency.

Also water can also be used for temperature control of the ion-conductive membrane. It is even possible that the membrane is equipped with a heat exchange element for cooling or heating the membrane. This feature may help to optimise the operating of the membrane electrode assembly.

The low pressure side (e.g. pressure chamber or chambers) can be integrally arranged within the high-pressure hydrogen container (that may also be referred to as a high pressure chamber) such as a high pressure storage vessel or tank. Such a storage tank, which is preferably cylindrical, can have an opening at one or on both ends, closed by a connector block for connection of the tank to a high pressure hydrogen supply line and/or a hydrogen gas discharge line and electrical contacts for connecting electric circuitry. One or both of these adaptors can be connected to one ore more tubular ionic decompression cells, comprising a high pressure tube, able to resist the pressure difference between a central high pressure chamber and a coaxial low pressure chamber. Such an embodiment of the apparatus according to embodiments of the invention may be provided with a coaxial heat exchange channel, and/or an inner heat exchange tube, preferably of a polymer material, which can be used for cooling and/or heating. The tubular ionic decompression cell can, e.g., be connected to an end adaptor by welding or soldering or by mechanical connection in combination with high pressure gaskets. Pressure changes and temperature changes of the tubular apparatus as well as temperature of the high pressure tank, will result in length changes during operation. This problem can for example be solved by fixing the tubular ionic decompression cell only on one side, and providing a sliding fixture on the other side. Optionally, the connector block can be provided with additional features such as a high pressure inlet, a pressure reducer, an excess flow valve, a needle valve, pressure and/or temperature sensors, an overpressure relief valve, a low pressure outlet, the contacts, grounding and/or power and control electronics.

Alternatively, the "membrane" can also be composed as a stack of proton conductive sub-membranes each sub-membrane being sandwiched between a surface cathode and an surface anode, wherein a first porous layer overlays the surface anode and is in open communication with the high pressure side and sealed against the low pressure side whereas the surface cathode is covered by a second porous layer which is in open communication with the low pressure chamber and sealed against the high pressure side. The first porous layer on a first sub-membrane in the stack is separated from the second porous layer of a second sub-membrane above the first sub-membrane by an electro conductive layer, which is impermeable for hydrogen ($H_2$). This way, a series connection is obtained wherein electrons from the anode of a sub-membrane electrode assembly can migrate to the cathode of a higher stacked membrane electrode assembly to recombine with protons conducted by the higher stacked membrane. The top of the membrane electrode assembly can be connected with the lowest membrane electrode assembly via an external electric circuit. The surface anode can partly penetrate the porous structure. This results in a roughly structured anode with increased surface area. It has been found that this improves the pressure resistance of the anode. Similarly, the cathode can partly penetrate the adjacent porous structure, which similarly results in improved pressure resistance of the cathode.

Alternatively, one or more of the low pressure chambers can be sandwiched between two high pressure chambers. Parallel proton conductive membranes, can be used to border the sandwiched low and/or high pressure chamber.

The low-pressure chamber can comprise a hydrogen discharge, which may for instance be operatively connected or connectable to the energy converter.

In operation, the high-pressure side of the membrane can be pressurized with hydrogen, generally at a pressure of at least 0.6 MPa, in particular between 0.6 and 200 MPa, more in particular between 1 and 100 MPa, still more in particular between 20 and 90 MPa, or between 60 and 90 MPa, while the low-pressure side of the membrane may for example comprise hydrogen at a pressure which is lower than the pressure in the high pressure side, in particular below 1 MPa, more in particular between 0.15 and 0.6 MPa.

Pressures can be measured by known instruments connected to the different sides of the membrane. Where the low-pressure chamber is connected to an energy converter it is preferred for the pressure to be higher than the pressure in the energy converter, e.g., at least sufficiently higher than to create sufficient hydrogen flow for the energy converter to operate. Typically, a pressure difference of at least 10 kPa between the low pressure side of the membrane and the energy converter should be sufficient.

The ion/conductive membrane, also referred to a membrane electrode assembly, as part of the present invention may be manufactured in numerous manners. In general it will encompass combining a first electrode, a membrane, a second electrode, and, where applicable a support structure. In one embodiment the membrane electrode assembly is manufactured as follows: on a porous support a layer is deposited to form the second electrode. The layer can be deposited by methods known in the art for the application of these types of materials, e.g., sputtering, deposition, MOCVD, electroplating, electro-less plating, printing, spray coating, transfer coating, etc. The membrane is then applied onto the second electrode. How this is done will depend on the nature of the membrane. In one embodiment, the membrane is formed in situ, e.g., by in situ deposition of an inorganic electrolyte such as perovskite, of by in situ formation of a polymer layer. Alternative methods include for example spray coating, transfer coating and plasma polymer coating. The first electrode in then deposited onto the membrane layer, for example by any one of the methods described above for the second electrode. In use, the hydrogen pressure difference between the high-pressure side and the low-pressure side of the ion/conductive membrane as part of embodiments of the invention can become large. This means that the membrane preferably has a limited permeability for molecular hydrogen. This can be obtained by using a membrane which comprises at least two ion-conductive layers, wherein at least one of said ion-conductive layers is electrically insulating and at least one of said ion-conductive layers is electrically conductive. The electrically conductive layer is positioned at the high-pressure chamber side of the membrane; the electrically insulating layer is positioned at the low-pressure chamber side of the membrane. In the ion-conductive membrane of the present invention, the hydrogen pressure difference between the high pressure side and the low-pressure side will cause molecular hydrogen to pass through the membrane. The membrane of this embodiment has a decreased permeability for molecular hydrogen. Without wishing to be bound by theory it is believed that this is caused by the following mechanism.

Within the electrically conductive layer of the membrane, molecular hydrogen reacts to form protons and electrons. The protons are transported through the ion-conductive membrane. The electrons are transported through the conductive layer back to an electrode. Consequently, the local hydrogen concentration in the electrically conductive layer is considerably reduced at particular locations by these reactions. These locations constitute drains for further molecular hydrogen that may react as well. This results, in short, in intercepting molecular hydrogen that is permeating through the membrane and causing it to contribute to the efficiency of the apparatus. When the apparatus is in use, the electrically conductive layer acts as a barrier against transfer of molecular hydrogen through the membrane. Within the context of the present specification, an ion-conductive layer is a layer with ion conductivity, in particular a proton conductivity, of at least 0.01 S/cm. An electrically insulating layer is a layer with an electric break down strength of at least 10 kV/mm. An electrically conductive layer is a layer with an electric breakdown strength of less than 10 kV/mm.

For the materials which can be used to manufacture the insulation layer reference is made to what has been stated above. If so desired, the electrically insulating layer contains spacer particles, that is, particles which help to ensure that the layer has a predetermined thickness. This is important because while the electrically insulating layer may be quite thin, for example in the region of 0.1-10 microns. It should not contain sections which are too thin, as this will affect the breakdown strength of the layer. The use of spacer particles, of a size of, between 0.1 and 10 microns, will ensure that the electrically insulating layer is locally not thinner than the stipulated value. The use of spacer particles is known in the art.

To improve properties like mechanical strength and durability, the membrane may be reinforced with fibres, porous films or layers, e.g., of polymer like Solupor®, or reinforcing particles, such as silica. If so desired the reinforcing material or spacer material, if used, may be pre-treated to ensure improved compatibility with the membrane layers.

The permeability for molecular hydrogen of the various layers of the membrane should be as low as possible. In general this will mean that the membrane layers will be non-porous. Should pores be present in one or more membrane layers, the pore structure should be such that the permeability for molecular hydrogen is not substantially affected. This will generally mean that the pore structure is discontinuous, and that any pores have a diameter which is significantly below the diameter of the membrane layer. In one embodiment, the ion-conductive and electrically conducting layer of the membrane comprises an ion-conductive matrix with an electrically conductive filler dispersed therein. The ion-conductive matrix is for example a polymer matrix. Suitable polymers are those discussed above for the insulating layer.

The electrically conductive filler comprises a particulate conductive material, such as carbon. The amount of filler should be selected such that the filler forms a conductive network of particles within the polymer matrix. If the amount of filler is too low, a network of particles will not be formed and the electrical conductivity of the layer is detrimentally affected. On the other hand, if the amount of filler is too high, the amount of ion-conductive matrix is too low, and the ion conductivity of the layer is affected.

Further, if the amount of filler is too high, the amount of matrix may become so low that it becomes difficult to obtain a continuous membrane layer. This may lead to an increased permeability for molecular hydrogen. The appropriate amount of filler depends on the nature of the matrix, on the conductivity of the filler, and also on its particle size and shape. Suitable fillers include carbon materials such as carbon nano tubes and carbon particles. As an example of a suitable carbon material KetjenBlack® EC 600 of Akzo Nobel, or Vulcan® of Cabot may be mentioned. It is within the scope of the skilled person to prepare ion-conductive electrically conductive layers on the basis of the above. The reaction in the ion-conductive electrically conductive layer from molecular hydrogen into protons and electrons is catalysed by catalytically active sites present in the layer. These sites may form automatically, e.g., by migration of some catalyst, such as platinum, from the electrodes into the electrically conductive layer. However, they may also be formed on purpose, by incorporating a catalytically active material into the membrane during manufacture. In one embodiment this can be done by applying a catalytically active material, for example platinum onto the filler material.

It is also possible that the concentration of catalytic sites in the electrically conductive layer is inhomogeneous over the cross-section of the layer, with the concentration being lower at the electrode-side of the layer and higher at the side of the layer which is adjacent to the electrically insulating layer. In this embodiment the reaction of the molecular hydrogen to form protons take place further away from the electrode. This reduces the formation of a driving force for molecular hydrogen into the membrane. In one embodiment, the electrically conductive layer is built up from two or more layers, wherein the outer layer, that is, the layer on the electrode side of the membrane has a content of catalytically active material which is lower than that of the layer(s) further removed from the surface, with the content of catalytic material increasing with increasing distance from the electrode.

The total membrane generally has a thickness of 25 to 1000 microns, more in particular of 50 to 500 microns. The conductive layers generally make up between 1 and 99% of the total thickness of the membrane. More specifically, it may be preferred for the electrically conductive layers to make up a substantial part of the membrane. The electrically insulating layer may be relatively thin, as long as dielectric breakdown strength is higher than the maximum cell voltage.

Accordingly, in one embodiment the conductive layers make up between 30 and 90% of the total thickness of the membrane, more in particular between 50 and 80%. In one embodiment, the ion-conductive layer at the cathode side of the membrane has a concentration of catalytically active material which is higher than the concentration of catalytically active material in the electrically conductive layer at the anode side of the membrane.

In a further embodiment of the present invention, the ion-conductive electrically insulating layer is profiled, for example in the form of a regular or irregular wave or saw pattern, or in any other non-flat profile. The crux of this embodiment is that the transport of protons through the membrane is improved by ensuring that the direct ion of the electrical field over the electrically insulating layer is not parallel and opposite to the transport direction of the protons over the entire surface of the electrically insulating layer.

The membranes described above may be manufactured by methods known in the art for the manufacture of multilayer films. Examples of suitable methods include co-extrusion, solution casting, slot dye coating, slide coating, etc. For example, a membrane may be manufactured by sequentially casting polymer solutions with appropriate compositions onto a surface, for example a film or a roll, and allowing the solutions to solidify before applying the next solution.

In operation, the ion/conductive membrane is provided with high-pressure hydrogen from a high-pressure hydrogen-containing storage tank. In operation, the low-pressure side of the ion/conductive membrane is connected to a hydrogen fed energy converter.

The ion/conductive membrane part of the power system according to embodiments of the invention can also be used as a compressor, e.g., for recharging, by applying a voltage over the membrane electrode assembly to induce an electric current from the low pressure chamber to the high pressure chamber. As a result, protons will move from the low pressure side to the high pressure side where it forms molecular hydrogen.

If the ionic decompression cell and the fuel cell are not in operation hydrogen can diffuse through the membranes from the high pressure side to the low pressure side until the pressure on both sides is balanced. To avoid damage due to diffusion, the membrane can be powered in such a way that it will pump hydrogen from the low pressure side back to the high pressure side until the required pressure level at one of the sides is restored.

In a preferred embodiment the energy converter comprises at least one fuel cell. Normally fuel cells are used in stack and function by oxidation of the hydrogen. For example in a fuel cell apparatus, such as a hybrid vehicle, the fuel cell, a battery, power electronics and an electric engines generate heat. In such an embodiment, the ion-conductive membrane has a connection for the supply of heated fuel cell coolant and a discharge connection for the discharge of cooled down fuel cell coolant, two electric connections, a high pressure hydrogen supply connection, and a low pressure hydrogen discharge connection to the low pressure side. Heat discharged by the fuel cell effectively balances the thermal energy that can be consumed by an ion/conductive membrane as incorporated in the power system according to embodiments of the invention. This way, the efficiency of energy management in the overall hydrogen fed power system is enhanced. The ion-conductive membrane can also operate as an impurity filter that protects the fuel cells. Fuel cells are easily contaminated and inactivated by certain impurities.

Typical impurities are argon, nitrogen, $NH_3$, $H_2S$, $CO$, $CO_2$ and water vapour. To avoid accumulation of these impurities, the high pressure hydrogen container (tank) can be flushed with pure hydrogen every now and then. Alternatively, or additionally, the ion-conductive membrane can be cleaned by a combination of heat and under-pressure. To clean the ion-conductive membrane, a voltage can be applied over the proton conductive membrane inducing an electric current via the electric circuitry from the low pressure side to the high pressure side and a proton current from the low pressure side to the high pressure side via the membrane, and wherein, optionally, the high pressure side is depressurized and/or thermal energy can be applied. Cleaning temperatures can be as high as 200° C., depending on the used materials. To heat the ion-conductive membrane to this temperature, the present heating and cooling connections can be used. The under-pressure can for example be high vacuum, e.g., below 100 Pa. For pressure reduction at the high pressure side (chamber) to under/pressure cleaning conditions, a high pressure connection can be used.

To make the power system to generate mechanical energy the hydrogen fed power system may further comprise an electric drive (also referred to as electric drive train) that is electrically connected to the fuel cell. For direct use of the electric power generated by the ion-conductive membrane, the membrane may be connected to the electric drive.

However as an alternative it is also possible that the energy converter is a hydrogen fed combustion engine. In such a combustion engine gaseous or liquid hydrogen may be injected that is burned and thus provides mechanical energy. Also the combination of fuel cells and a combustion engine is possible.

The heat guide may comprises a fluid circulation system, e.g. provided with heat exchange channels running through the high pressure side and/or the low pressure side of the ion-conductive membrane for transfer of thermal energy to the membrane. The heat can be discharged via a heat exchange fluid, such as a liquid coolant. However the heat guide may also connect the hydrogen driven energy converter with high conductive materials to the pressure converter.

As clarified before the ion-conductive membrane may be integrated with the high-pressure hydrogen container, even so that the ion-conductive membrane is fully surround by such container (tank).

In a further embodiment the hydrogen fed power system is provided with control means connecting to the pressure converter and the energy converter. Optionally, the apparatus according to embodiments of the invention may comprise one or more sensors, such as temperature sensors and pressure sensors, one or more valves—such as excess flow valves, pressure release valves (PRD), and needle valves—flow restrictors, cooling fins to control the hydrogen gas temperature in the high pressure chamber and power and control electronics, besides the one or more ionic decompression cells.

If the pressure in the high pressure chamber is suddenly dropped to a pressure below the pressure in the low pressure chamber the pressure direction on the membrane suddenly changes. This results in a risk that the membrane electrode assembly flakes off, and the ionic decompression cell is damaged beyond repair. To avoid this, a pressure release valve can be placed between the high-pressure chamber and the low-pressure chamber. This valve opens if the pressure in the low pressure chamber exceeds the pressure in the high pressure chamber.

If so desired, multiple de-compressor cells can be electrically connected in series. By having a series connection the out-put voltage multiplies with the number of cells. High voltage has an advantage over low voltage in that, at the same power output the losses in transmission lines and power electronics for the high voltage situation will be less than for the low voltage situation. Several ways of series connection are possible, such as monolithic series connection or discrete series connections. If a monolithic series connection is used, a support layer should be used which is a least partly electrically non-conductive.

Optionally, a plurality of ionic decompression cells can be assembled as a stack connected in series. During operation of the ionic decompression cell conditions can change continuously. For example, if the fuel tank in a fuel cell car, boat or airplane is just filled the pressure will be high, for example 80 MPa. During operation of the fuel cell car, hydrogen is consumed, and the pressure decreases, reducing the driving force of the protons in the ionic decompression cell. Also the temperature will generally not be constant. The voltage and the current of the ionic decompression cell can for example be controlled trough a DC/AC-converter, DC/DC-converter or another apparatus able to control voltage and current. This can be used to optimise voltage and current on maximum energy efficiency, or if desired on maximum power over the whole temperature and pressure difference range.

The present invention also provides transportation means, like e.g. a car, boat or airplane provided with an hydrogen fed power system as described above. Especially for automotive application the present power system is an alternative for the fossil fuel driven units. The power system may be used as power system vehicles like buses, trucks, passenger cars, boats and airplanes. The present invention is particularly suitable for use in vehicles which comprise a high-pressure hydrogen storage tank, wherein hydrogen is at a pressure of at least 1 MPa, in particular between 2 MPa and 200 MPa, more in particular between 20 MPa and 100 MPa, and one or more fuel cells. The ionic decompression cell of the present invention will be applied between the hydrogen storage tank and the fuel cells. The use of the ionic decompression cell according to embodiments of the invention increases the energy distracted from the pressurized hydrogen to such extent that the operating radius of an automotive vehicle can increase with as much as 20%. Also the fuel efficiency will increase with about 20%. The ion-conductive membrane as part off the present invention is however suitable for use in all applications where hydrogen is de-pressurised.

Also for other applications than automotive drive systems the power unit of the present invention is applicable. Embodiments of the present invention also provide a stand-alone electric power unit provided with the claimed hydrogen fed power system. Examples of such stand-alone units are back-up power units for e.g. emergency situations, military applications, boats, campers and so on.

Embodiments of the present invention also provide a method for use of the hydrogen fed power system as described above, comprising the steps of: A) at least partially de-compressing supplied high-pressure hydrogen via the ion-conductive membrane de-compressor, B) driving the hydrogen fed energy converter with the de-compressed hydrogen, C) supplying heat from the hydrogen fed energy converter to the ion-conductive membrane de-compressor, and D) utilizing electric power provided by the ion-conductive membrane as a result of the hydrogen decompression, and utilizing the power from the energy converter. It is further possible by stopping to compress the power generating low pressure hydrogen by the de-compressor by electrically feeding the ion-conductive membrane. The energy converter is so to be cleaned from hydrogen which not only results in more safety but can also be very useful in optimising the lifetime of e.g. fuel cells. For such use a voltage is applied over the ion-conductive membrane. This pumping function can also be useful during start-up of a fuel cell application, for example a fuel cell hybrid car, boat or airplane. For further advantages of the method reference is made to the advantages mentioned in relation to the power system of the present invention.

Embodiments of the present invention also provide a method for filling up the high-pressure hydrogen container of the hydrogen fed power system as clarified before, comprising the steps of: X) providing a hydrogen comprising gas at the low pressure side of the ion-conductive membrane de-compressor; Y) reverse driving the ion-conductive membrane de-compressor by electrically feeding the ion-conductive membrane; and Z) storing the compressed hydrogen high-pressure hydrogen container. In this situation the ion-conductive membrane is not only used for compression but also for filtering of hydrogen from a gas mixture. In case a gas mixture is available that contains a substantive fraction of hydrogen the power system of embodiments of the invention may be used for filling up the hydrogen container again. An option for filling up the hydrogen container can e.g. the make use of a natural gas supply (of which the hydrogen content can be filtered out and compressed) or of a local electrolyser of water, thermo chemical water processing and/or biological hydrogen production (e.g. by alga or microbes).

BRIEF DESCRIPTION OF THE DRAWINGS

The invention is further elucidated on the basis of the non-limitative exemplary embodiments shown in the following figures. Herein.

DETAILED DESCRIPTION

Figure 1:
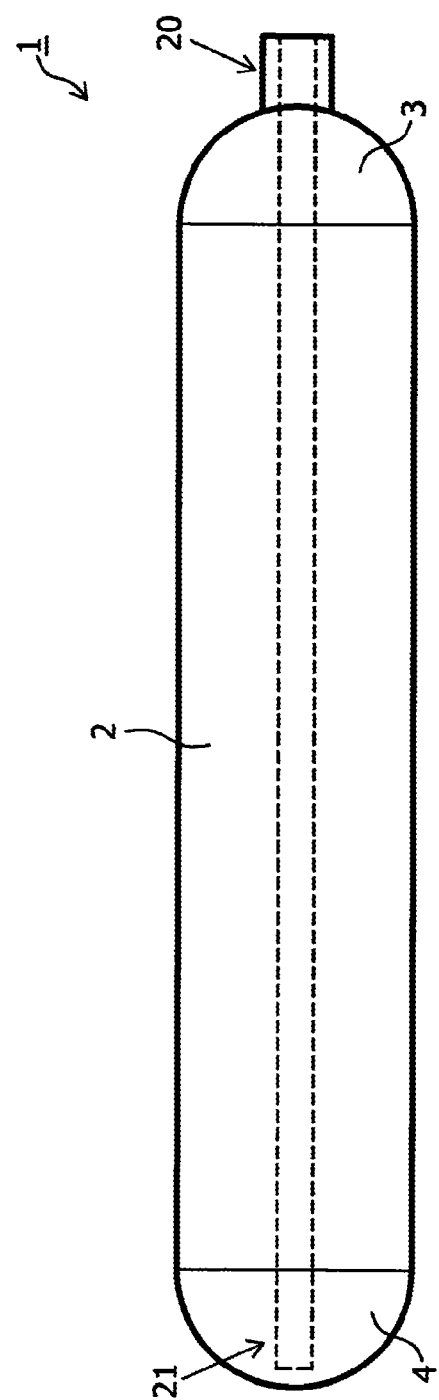
FIG. 1: shows an ionic decompression cell according to the present invention.
Figure 3:
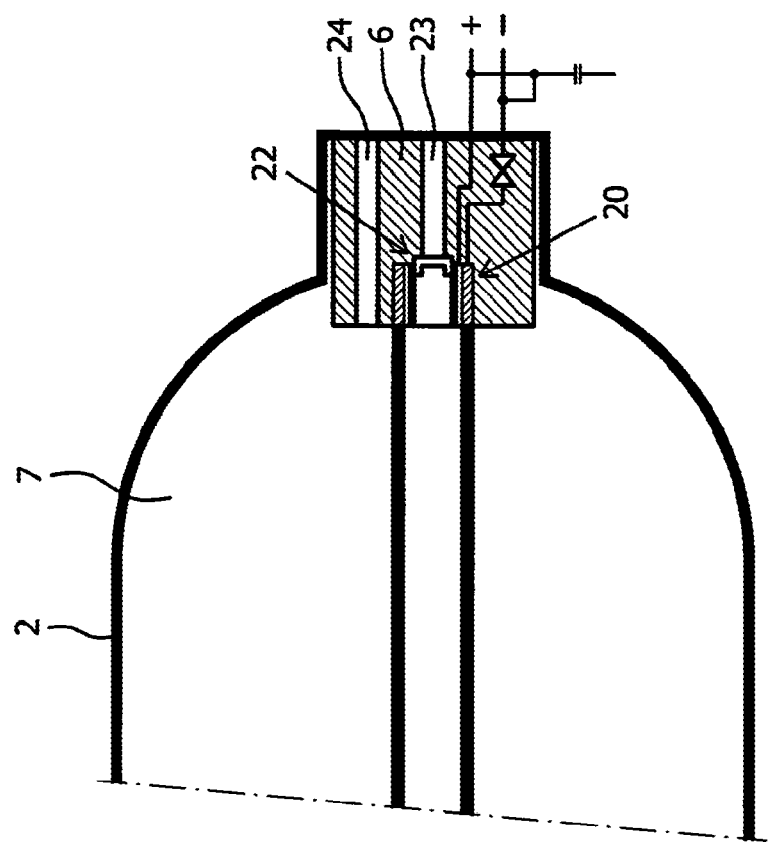
FIG. 3: in part a longitudinal cross section of the apparatus of FIG. 1.
Figure 2:
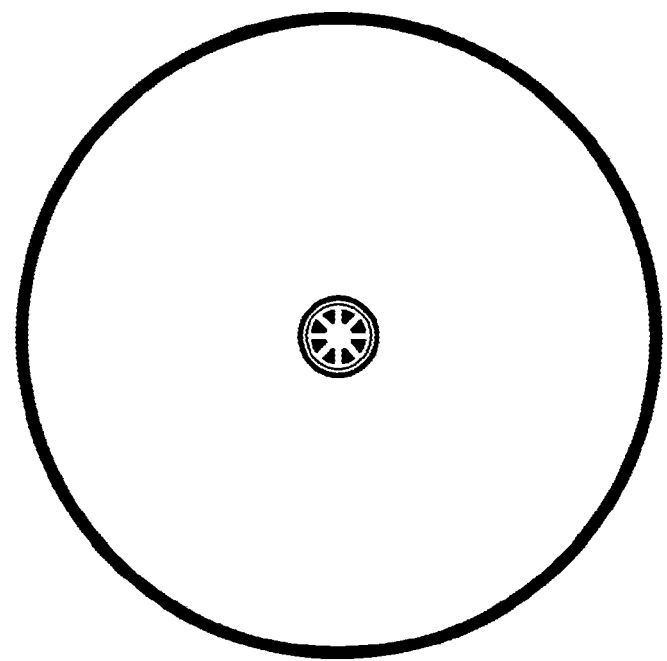
FIG. 2: a cross section of the apparatus of FIG. 1.
Figure 4:
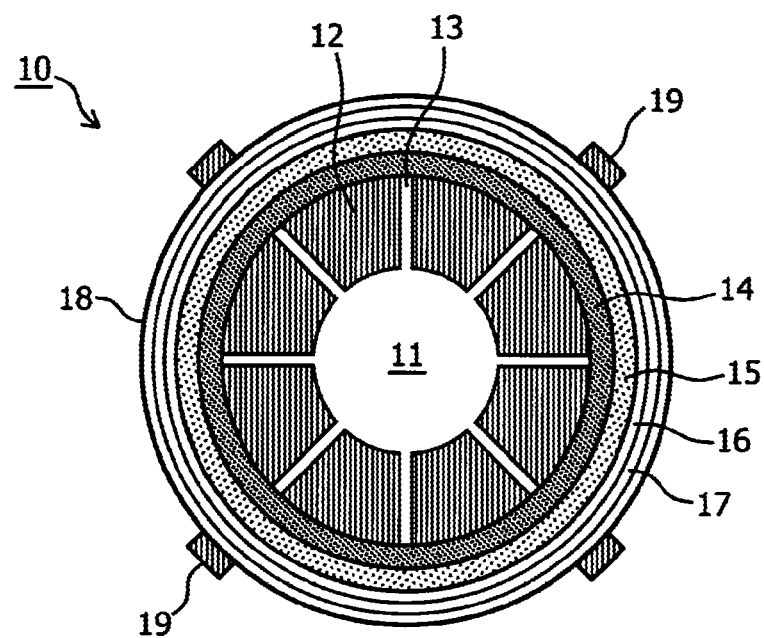
FIG. 4: a cross section of the membrane electrode assembly and low pressure chamber of the ionic decompression cell in FIG. 1.

FIG. 1 shows an ionic decompression cell according to embodiments of the invention comprising a high pressure hydrogen tank 1, e.g., for a fuel cell of an automotive vehicle. Typically, such a hydrogen pressure tank has a length of about 2 meters and a diameter of about 0.4-0.5 meter. The tank 1 comprises a cylindrical body 2 capped with semi-spherical end sections 3, 4. One of the end sections 3 comprises an opening 5 plugged with a connector block 6 with provision for various connections, as will be explained hereinafter. The interior of tank 1 forms high pressure chamber 7 containing pressurized hydrogen $H_2$. Within the tank 1 a membrane tube 10 extends from one end section 4 to the opposite end section 3 in coaxial arrangement with the cylindrical body 2. The outer diameter of the membrane tube is about 20 mm. As shown in more detail in FIG. 4, the decompression tube comprises a central low pressure chamber 11 surrounded by a mechanically rigid pressure resistant tubular wall 12, which is resistant to at least the pressure difference between the pressure in the low pressure chamber 11 and the pressure in the pressure tank 1. The tubular wall 12 can for example be made of a stainless steel, such as Steel grade 316. The tubular wall 12 is provided with radially extending apertures 13. On its outer surface the tubular wall 12 is coated with a macro-porous support layer 14 with pores of more than 1 micron. This support layer can be a metal coating, e.g., applied by slurry dipping and sintering, and can for example have an average layer thickness of about 1 mm. Applied on top of this macro-porous support layer 14 is a sintered micro-porous support layer 15 of a metal coating with pores of less than 1 micron. On top of this micro-porous support layer a Group VIII metal cathode layer 16 is applied, e.g., by means of vacuum sputtering. During the sputtering process the tube is rotated to get a uniform coating thickness. This porous cathode layer 16 contains a suitable catalyst and is conductive for protons as well as for electrons. To this end, the cathode layer 16 can for example be a platinum, palladium or palladium alloy layer. The thickness of this cathode layer is about 1-3 microns. On top of the cathode layer is a non-porous proton conductive, electrically insulating membrane layer 17, e.g. made of a ceramic or polymeric material, with an average layer thickness in the range of 100-10000 micron. On top of this electrolyte membrane 17, an anode layer 18 is sputtered with a thickness of about 2 micron. The anode layer can for example be made of palladium or a palladium alloy. A copper grid 19 is applied on the anode layer 18, e.g., in an electro-less copper plating bath.

The outer ends 20, 21 of the membrane tube 10 are closed off by end walls. The outer end 20 is held in the connection block 6. The end wall 22 at this outer end comprises a discharge opening operatively connected to a discharge line for discharging depressurized hydrogen gas from the low pressure chamber 11 to, for instance, a fuel cell of an automotive vehicle via an opening 23 in the connector block. The discharge line can be shut with a valve (not shown). The connector block 6 further comprises an inlet opening 24 for connection to a high pressure hydrogen supply line, and provides electrical contacts 25 for respectively connecting the anode and cathode layer 16, 18 to electric circuitry. Optionally, the connection block 6 can also provide one or more sensors, such as pressure sensors and/or temperature sensors, valves, such as excess flow valves, pressure release valves (PRO), and/or needle valves, flow restrictors, cooling fins to control the gas temperature in the high pressure chamber, and power and control electronics.

Due to pressure changes and temperature changes of the length of the membrane tube 10 can change over time relative to the length of the high pressure tank 1. To compensate this, the outer end of the membrane tube 10 opposite the outer end connected to the connection block 6 is supported by a sliding fixture (not shown).

In the embodiment of FIGS. 1-4, the high pressure tank 1 comprises only one membrane tube 10. In other embodiments, two or more membrane tubes 10 can be used, e.g., in a parallel arrangement. For instance, one central decompression tube 10 can be arranged coaxially within the high pressure tank 1, surrounded by five or six equidistantly arranged decompression tubes 10, which may for example be of the same diameter.

Figure 5:
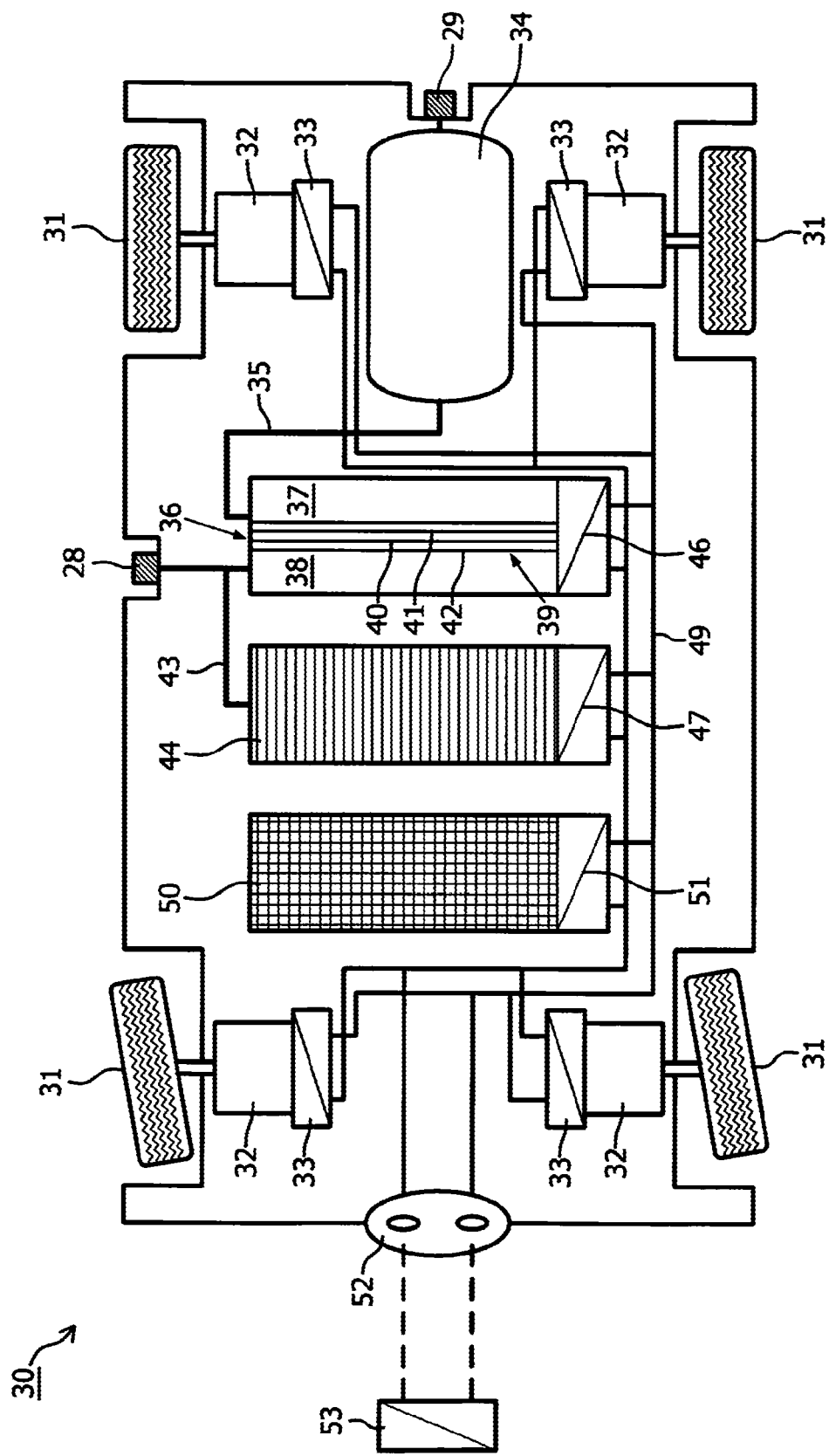
FIG. 5: shows schematically a longitudinal cross section of a high pressure vessel according to the present invention.

FIG. 5 shows schematically the bottom side of an automotive hybrid fuel cell vehicle 30 with four wheels 31. Each wheel 31 is directly driven by an electromotor 32. Each electromotor 32 comprises a control unit 33. The vehicle 30 further comprises a high pressure hydrogen tank 34 with a filling nipple 29 for the supply of pressurized hydrogen gas. A high pressure hydrogen supply line 35 leads to an electrochemical cell 36. The electrochemical cell 36 comprises a high pressure chamber 37 operatively connected to the supply line 35, and a low pressure chamber 38. The high pressure chamber 37 and low pressure chamber 38 are separated by a membrane assembly 39 comprising an electrically insulating, proton conductive membrane 40. The membrane 40 has a surface in the high pressure chamber 37 coated with an anode layer 41 of an electro conductive, proton conductive layer comprising a catalytically effective material to catalyze the conversion of hydrogen $H_2$ to protons and electrons. The other surface of the membrane 40 is coated with a cathode layer 42 comprising a catalytically effective material to catalyze the conversion of protons and electrons to hydrogen $H_2$. Via a supply line 43, the hydrogen gas regained in the low pressure chamber 38 is transported to a fuel cell stack 44. The supply line 43 is connected to a low pressure filling nipple 28 for the supply of hydrogen gas under low pressure. The fuel stack 44 comprises a series of fuel cells wherein electricity is generated from the oxidation of hydrogen gas. Electric current is distracted from the electrochemical cell 36 via a DC/DC or DC/AC converter 46 to convert the current to the desired voltage level. Similarly, electric current is distracted from the fuel cell stack 43 via a DC/DC or DC/AC converter 47. An electric circuit 49 transports the electric current to a battery 50, comprising a battery management system 51, and to the electro-motors 33. The electric circuit 49 is provided with a charging plug 52 for the supply of electric power via an AC/DC converter 53. This creates a voltage over the membrane 40 of the electrochemical cell 36 inducing the migration of protons from the low pressure chamber 37 back to the high pressure chamber 38.

Figure 6:
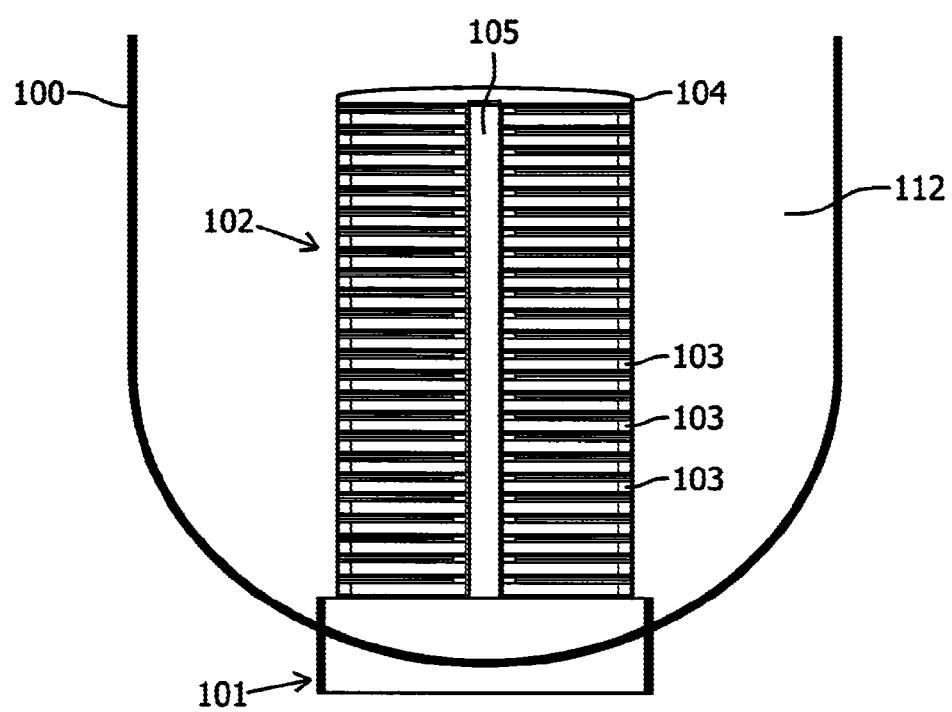
FIG. 6: in schematic longitudinal cross section a second embodiment of a high pressure vessel according to the present invention.

FIG. 6 shows a high pressure vessel 100 according to the present invention. The vessel 100 is filled with pressurized hydrogen gas under a pressure of, for instance, 800 MPa. The vessel 100 comprises an outlet 101 plugged with a stack 102 of ionic decompression cells 103. On top of the stack 102 is a cover plate 104. The cover plate 104 can be fixated within the pressure vessel 100, e.g., by means of tie rods or tension members or the like (not shown). Centrally arranged within the stack 102 and coaxially with the vessel 100 is a tubular low pressure chamber 105.

Figure 7:
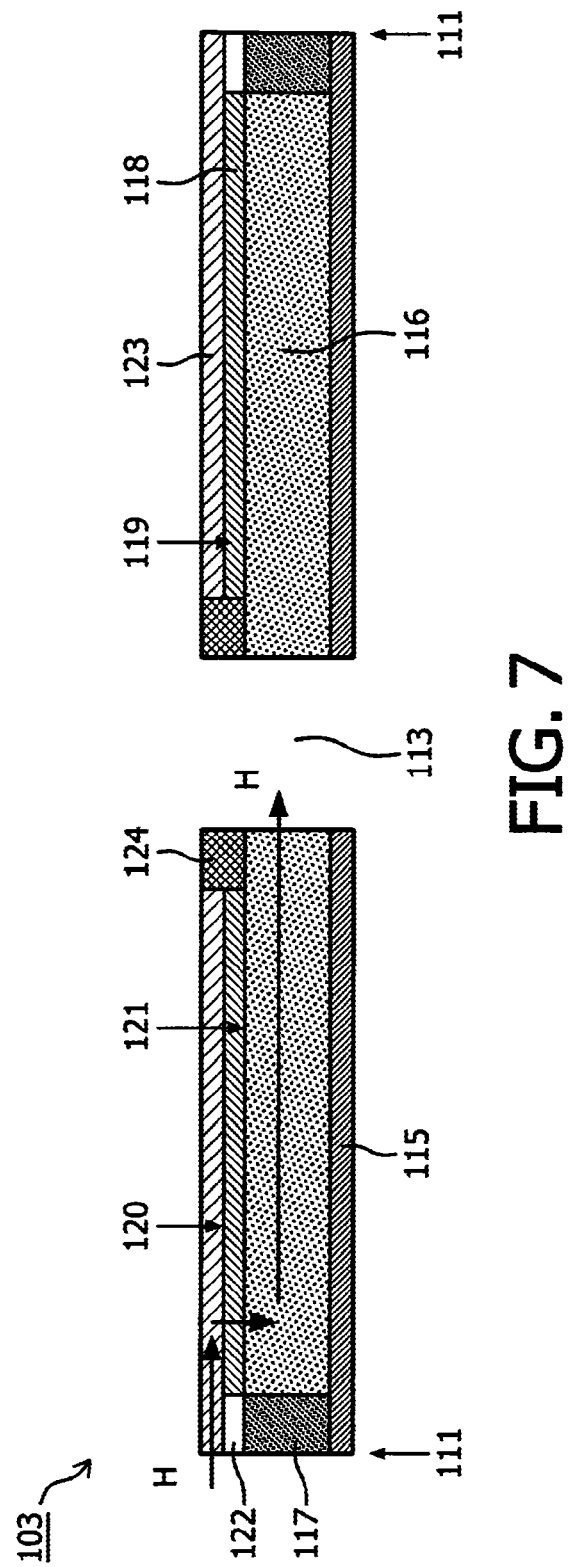
FIG. 7: in schematic cross section a cell of a stack of the vessel of FIG. 6.

FIG. 7 shows one of the ionic decompression cells 103 in more detailed cross section with arrows indicating the flow of hydrogen as H2 and as protons, respectively. Each cell 103 has an outer circumference 111 facing the high pressure vessel interior 112, and an inner opening 113 forming an axial segment of the low pressure chamber 105. The cell 103 comprises an aluminium foil base layer 115, extending from the opening 113 to the circumference 111. On top of the base layer 115 is a layer 116 of porous aluminium extending from the opening 113 to a point at short distance from the outer circumference 111 where it is capped by a sealing segment 117 of aluminium which seals the porous layer 116 from the high pressure vessel interior 112. On top of the porous layer 116 is a membrane electrode assembly 118 comprising a proton conductive membrane 119 of about 25 μm sandwiched between an anode surface 120 and a cathode surface 121, both having a thickness of about 1 μm. In line with the membrane electrode assembly 118 and on top of the sealing segment 117 is a sealing strip 122 to seal the membrane electrode assembly from the pressure vessel interior 112. On top of the membrane electrode assembly 118 and the sealing strip 122 is a porous layer 123 of a copper alloy. The membrane electrode assembly 118 and the porous copper alloy layer 123 are sealed from the central opening 113 by a high pressure gasket 124. The gasket 124 and the copper alloy layer 123 show some degree of compressibility to compensate for pressure changes. The aluminium foil base layer 115 comprises a collar 125 around the opening 113. The collar 115 has an outer diameter forming a tight fit with the inner diameter of the gasket 124. The hydrogen flow through the cell 103 is indicated by arrows H. From the high pressure vessel interior, where the pressure can be as high as about 80 MPa, hydrogen gas flows into the porous copper alloy layer 123, where it contacts the anode surface 120. At the anode surface, the hydrogen gas is decomposed as described above into electrons and protons. The protons pass through the proton conductive membrane 119 to the cathode surface 121, where they recombine to $H_2$ hydrogen gas with electrons coming from the anode layer of a lower cell 103. The recombined hydrogen gas migrates through the porous layer 116 to the opening 113, where a hydrogen discharge channel is defined, as described hereinafter with reference to FIG. 7. An external electric circuit (not shown) connects the surface anode of the upper cell 103 of the stack 102 to the surface cathode of the lowest cell 103. This way, electric current is generated through the electric circuit which may for example comprise a DC/DC or DC/AC converter or other type of electric load.

Figure 8:
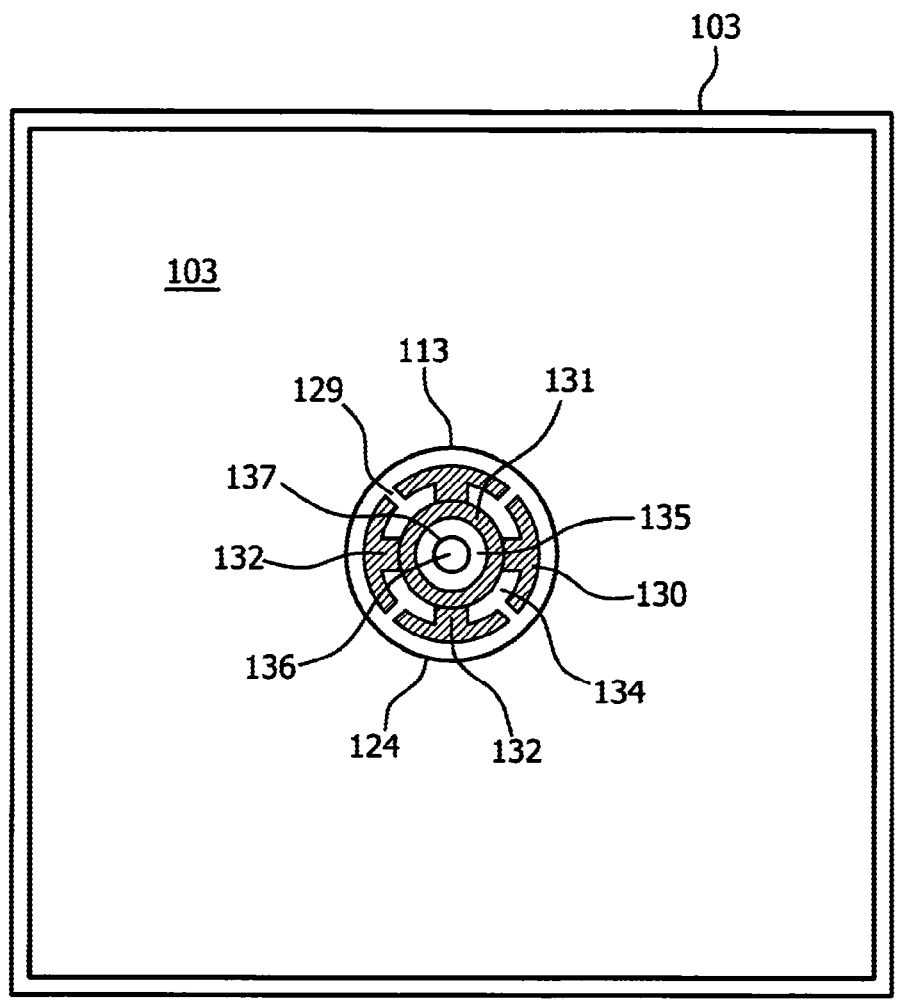
FIG. 8: in plan view the cell of FIG. 7.

FIG. 8 shows a cell 103 in plan view. Through the opening 113 runs a cylindrical outer channel wall 130 and coaxially therewith an inner channel wall 131, which is also cylindrical. The outer channel wall 130 is made of a heat conductive material, such as an aluminium alloy. The channel wall 130 is provided with drilled openings 129 to allow passage of hydrogen gas from the porous aluminium layers 116 of the cells 103. The outer surface of the channel wall 130 is provided with a layer which is heat conductive but electrically insulating to prevent short circuiting between the stacked cells. If the outer channel wall is made of an aluminium alloy, the electrical insulating outer surface can be obtained by the formation of aluminium oxide, e.g., by anodic treatment. The inner channel wall 131 is a material of a high thermal conductivity. Spacers 132 maintain a distance between the outer channel wall 130 and the inner channel wall 131. In the drawing, the spacers 132 extend radially. Alternatively, the spacers 132 can be under an angle with the radial direct ion to provide a resilient connection between the two channel walls 130, 131, which provides compensation for dimensional instability due to temperature and pressure changes. The two channel walls 130, 131 define two coaxial channels 134, 135. Hydrogen gas migrates from the porous aluminium layers 116 through the outer channel wall 130 into the outer channel 134. The inner channel 135 forms a heat exchange channel for guiding a heat exchange liquid from outside the vessel top of the channel 135 just below the cover plate 104 of the stack 102. Trough the inner channel 135 runs a return channel 136 defined by a channel wall 137 of low thermal conductivity, e.g., of a polymer material.

When hydrogen migrates from the high pressure vessel 100 through the cells 103 to the low pressure channel 134, the hydrogen expands which results in substantial decrease of temperature. Since the electrochemical process in the cell 103 requires thermal energy, supply of external heat is desirable. To this end, a heat exchange medium, e.g. a liquid, can be used, preferably the heated cooling liquid coming from a cooling system of associated heat generating sections of the vehicle or installation of which the high pressure vessel forms a functional part. The liquid is transferred along the inner channel wall 130, where it dissipates heat to the cells 103. By the time the liquid reaches the cover plate 104 it has cooled down and it enters the return channel 136, where it is discharged, e.g., to return to heat generating sections which need to be cooled down.

The stack 102 as shown in FIG. 8 has a square outline. The stack 102 can have any other suitable shape, e.g., a circular outline, if so desired. Rectangular shapes have the advantage that they can be manufactured with less loss of material.

Figure 9:
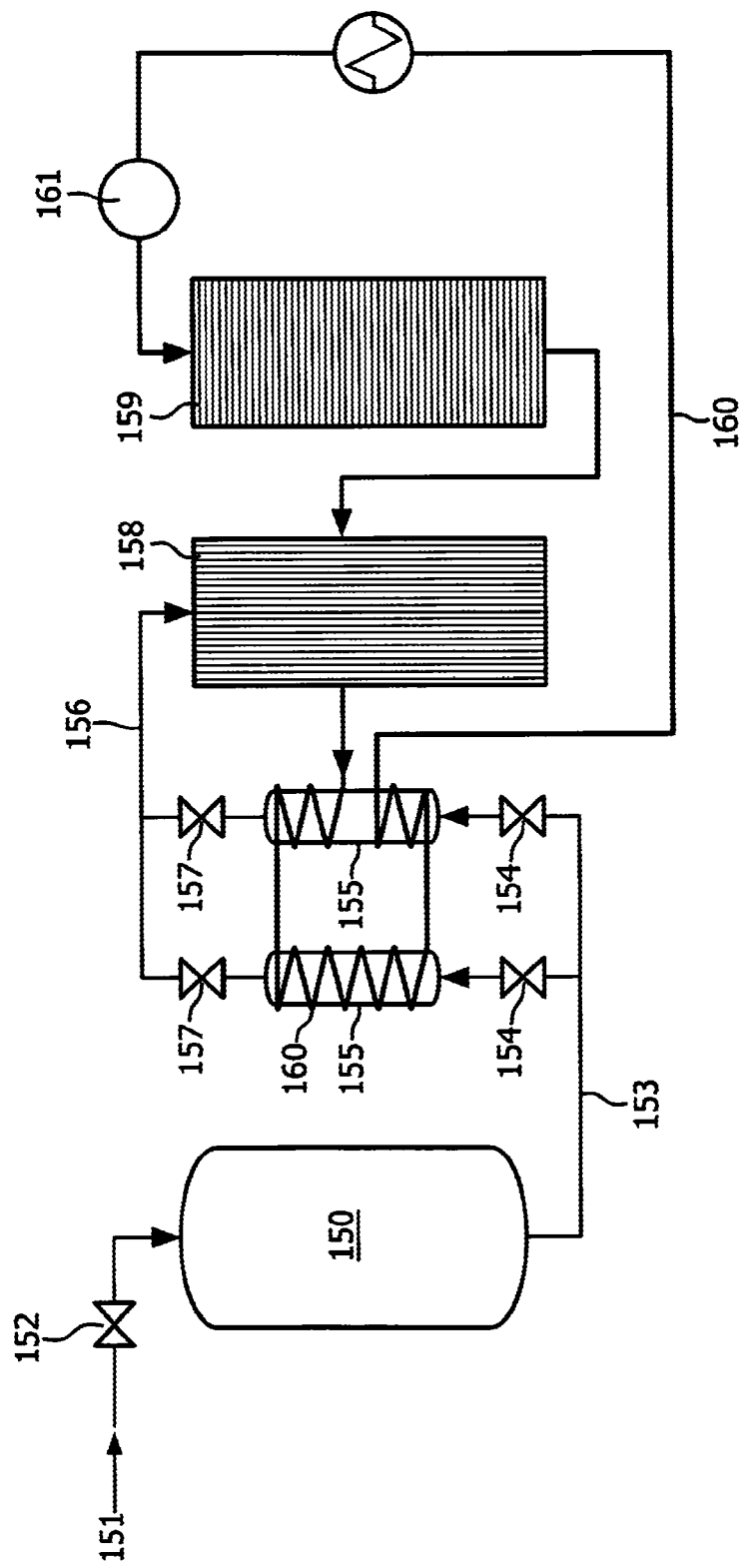
FIG. 9: schematically a configuration for the use of liquefied hydrogen gas using a ionic decompression cell according to embodiments of the invention.

The apparatus as shown in FIG. 1 or FIG. 6 can also be used with liquefied hydrogen gas, for instance in a configuration as shown in FIG. 9. A storage vessel 150 for the storage of liquefied hydrogen is linked to a liquid hydrogen supply 151 comprising a valve 152, and to a liquid hydrogen discharge line 153 with an adequate arrangement of valves 154 for transporting the liquid hydrogen to two parallel hydrogen evaporators 155. In the evaporators 155, the liquid hydrogen is transformed to pressurized hydrogen gas, which is transported via a hydrogen gas line 156 comprising an adequate arrangement of valves 157, to a decompression vessel 158 according to embodiments of the invention, for example a vessel as shown in FIG. 1 or FIG. 6.

Decompressed hydrogen is then transported from the decompression vessel to a fuel cell 159 via a supply line (not shown). Evaporation of the hydrogen liquid in the evaporators 155 causes a substantial decrease in temperature. A cooling medium is transported via heat exchange channels 160 spiraled along the outside of the evaporators 155. After passing the evaporators, the cooled cooling medium is pumped via the channels 160 by a pump 161 to the fuel cell 159, where the cooled cooling liquid absorbs the heat generated by the fuel cell 159. The heated cooling medium is then transported to the decompression vessel 158. In the decompression vessel 158, heat is lost as a result of the expansion by the hydrogen gas when it migrates from the high pressure chamber to the low pressure chamber, as explained above. The cooling medium transports the heat from the fuel cell 159 to the decompression vessel 158 where it is used to keep the temperature of the contained hydrogen at a level optimized for the decompression process. The coolant is then returned to the spiraled cooling channel section around the evaporators 154 where it dissipates residual heat and where it is further cooled before being returned as a coolant to the fuel cell 159.

Figure 10:
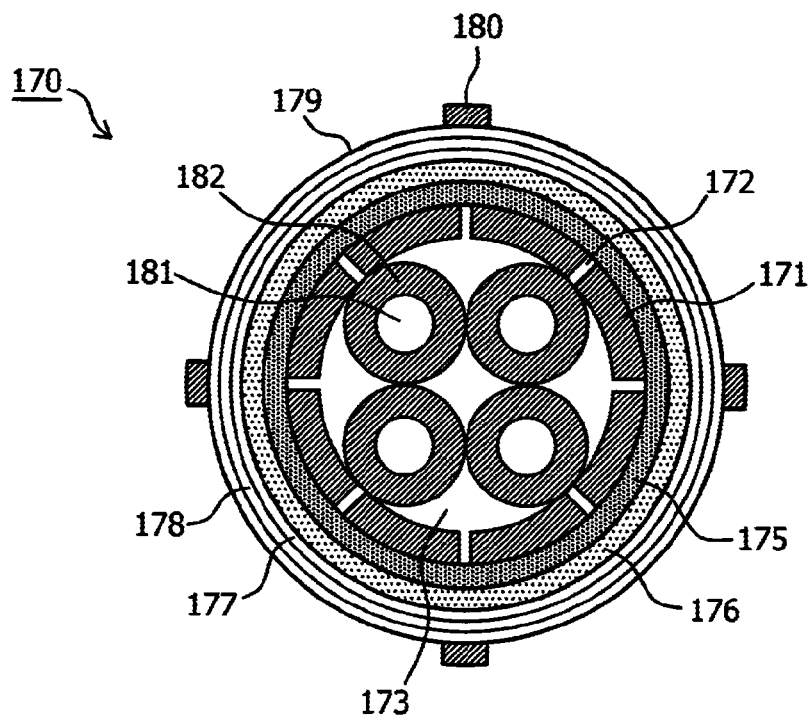
FIG. 10: in cross section a cooling system for an ionic decompression cell according to embodiments of the invention.

FIG. 10 shows schematically in cross section a tubular ionic decompression cell 170 for use in a high pressure vessel. The ionic decompression cell 170 comprises a high pressure resistant cylindrical channel wall 171 provided with apertures or perforations 172 for the passage of decompressed hydrogen gas to a low pressure chamber 173 confined by channel wall 171. The channel wall 171 is coated with a macro-porous layer 175, which is in turn coated with a micro-porous layer 176, both concentric layers being permeable for hydrogen gas. The micro-porous layer 176 is coated with an cathode layer 177, which is coated with a non-porous proton conductive and electro insulating membrane 178, which is in turn coated with a porous anode layer 179. A current collecting grid 180 is applied on the outside of the anode layer 179. Four coolant channels 181 are arranged within the low pressure chamber 173, defined by tubular channel walls 182 to provide effective temperature control and to optimize the decompression process.

Figure 11:
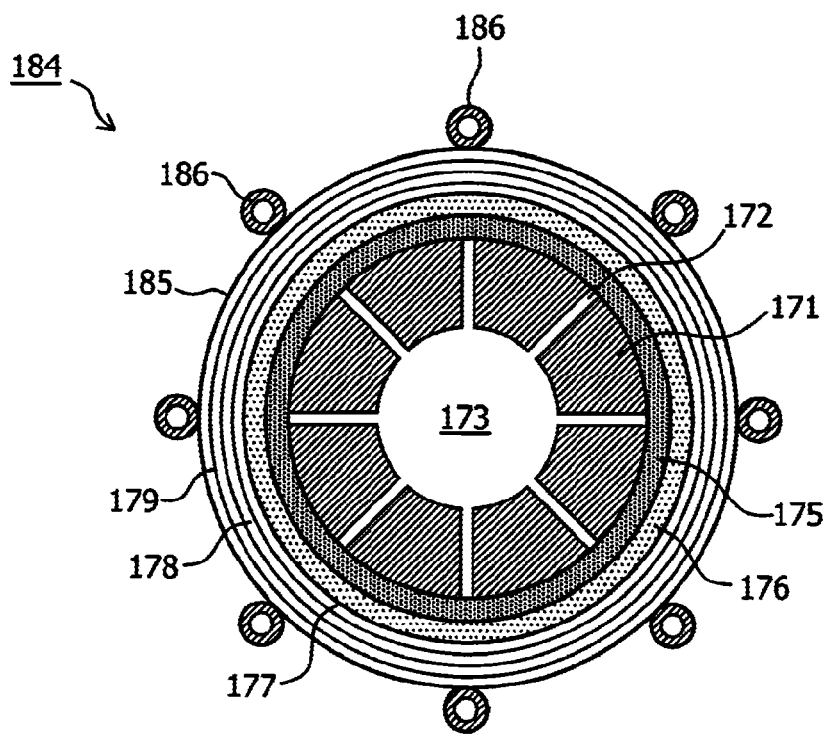
FIG. 11: in cross section an alternative cooling system for an ionic decompression cell according to embodiments of the invention.

Alternatively, or additionally, heat exchange channels can be arranged on the outer surface of the de/compressor, as for example is shown in FIG. 11, where the same reference numbers are used as in FIG. 10 for parts which are the same in both embodiments. In this case, the cathode layer 179 of the de/compressor cell 184 is coated with a current collection layer 185. Heat exchange channels 186 are arranged on the high pressure side of the ionic de/compressor cell 184 in order to keep the pressurized hydrogen in the high pressure chamber at a desirable temperature.

Figure 12:
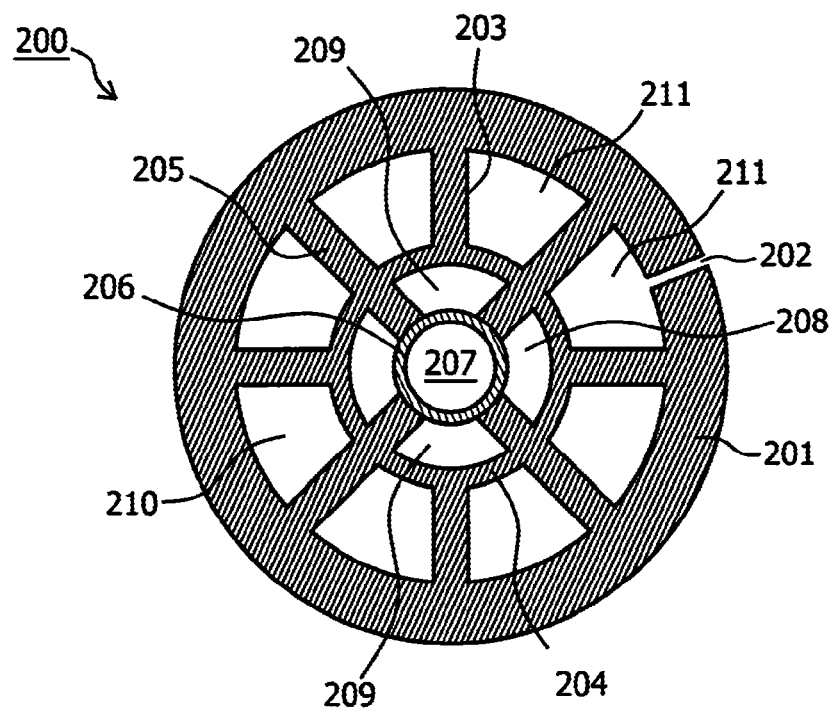
FIG. 12: in cross section an alternative configuration of cooling channels for an ionic decompression cell according to embodiments of the invention.
Figure 13:
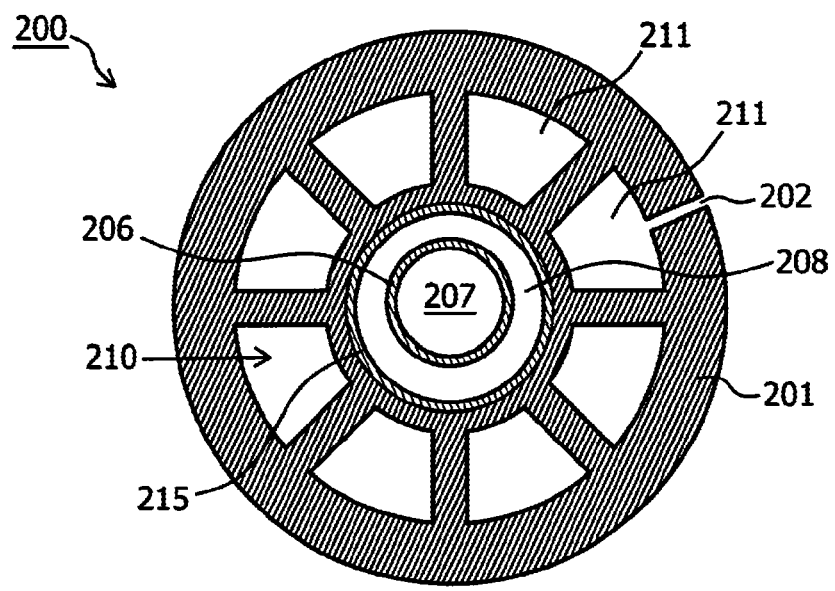
FIG. 13: in cross section an further alternative configuration of cooling channels for an ionic decompression cell according to embodiments of the invention.

FIGS. 12 and 13 show extruded profiles which can be used in an ionic decompression cell according to embodiments of the invention, for example as shown in FIG. 1 or 5. In use, the profiles are surrounded by membrane electrode assemblies or by a stack of such assemblies (not shown). In FIG. 12, the extruded profile 200 is a tubular profile resistant to high pressures and made of an aluminium alloy. The tubular profile 200 comprises an outer cylinder 201 provided with a plurality of drilled holes or apertures 202 (only one being shown in the drawing). Four orthogonally arranged spacers 203 extend inwardly to hold an inner tubular channel wall 204 in coaxial arrangement with respect to the outer cylinder 201.

Four larger inwardly extending spacers 205 hold a smaller tube 206 of a material of low thermal conductivity, e.g., a polymeric material. Each spacer 205 is arranged between two spacers 203 at equal distance. The polymeric tube 206 forms a return channel 207 for cooled heat exchange liquid. An inner coaxial channel 208 between polymeric tube 206 and inner tubular channel wall 204 forms a supply channel for heat exchange liquid. The inner coaxial channel 208 is divided by spacers 205 in four parallel equal channel parts 209. Between the outer cylinder wall 201 and the inner cylinder wall 204 is an outer coaxial channel 210 divided by the spacers 204, 205 in eight equal parallel channel parts 211. These channel parts 211 for a low pressure chamber for the re-collection of de-pressurized hydrogen gas.

FIG. 13 shows a variant which is similar to the one of FIG. 12. Same referential numbers are used for parts that are the same. In this embodiment, spacers 205 are of the same length as spacers 203. A polymer tube 215 is fitted into the interior of inner cylinder wall 204. Between this tube 215 and polymeric tube 206 is a supply channel 216 for heat exchange medium which is returned via the return channel 207 confined by polymeric tube 206.

Figure 14:
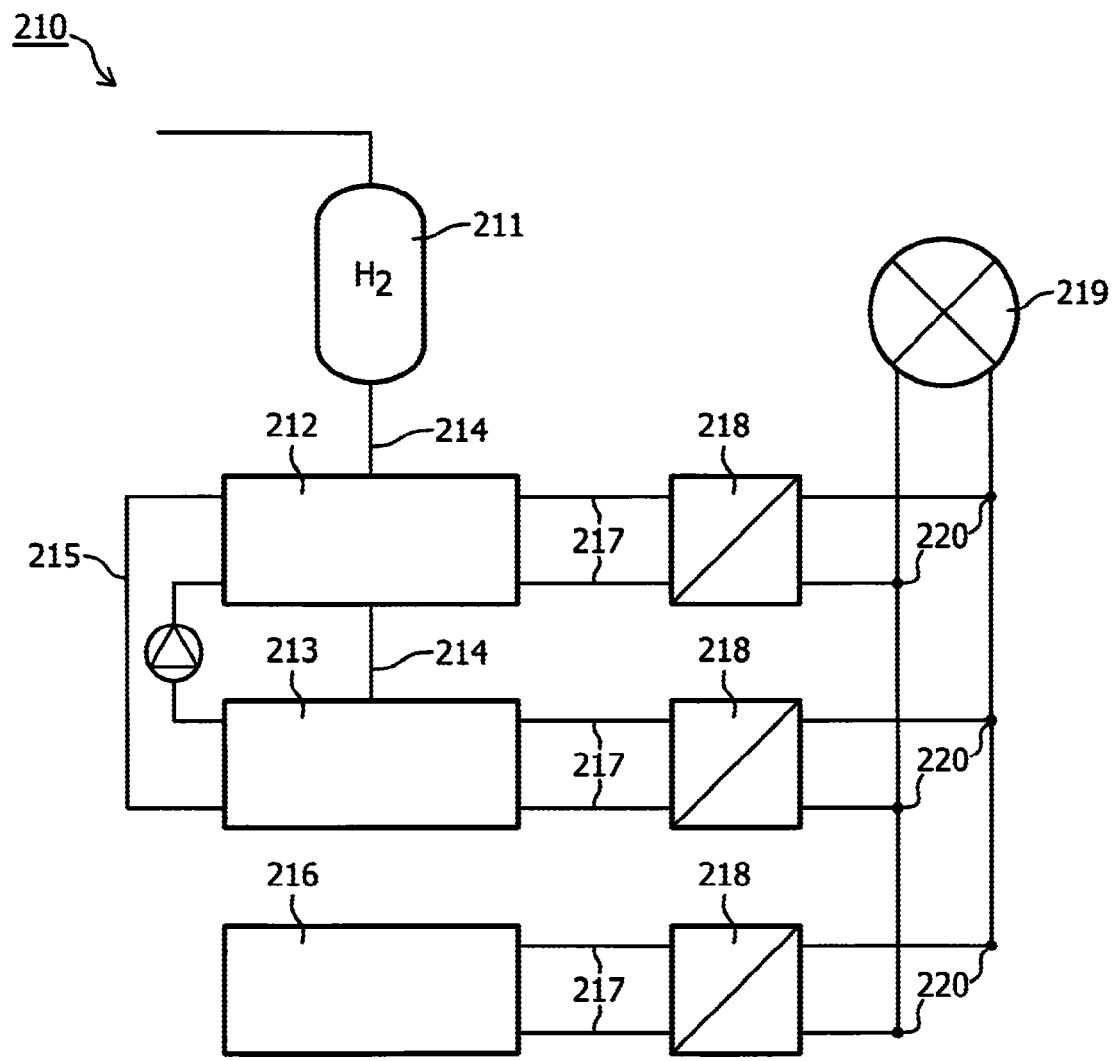
FIG. 14 a schematic view of a hydrogen fed power system according to embodiments of the present invention.

FIG. 14 shows a schematic view on an embodiment of a hydrogen fed power system 210 according the present invention including a high pressure $H_2$ container 211, a hydrogen operated energy converter 213 (fuel cell) connecting with hydrogen feed pipes 214 to the high pressure $H_2$ container 211 with an intermediate pressure converter 212 for hydrogen gas (compressor or decompressor). The pressure converter 212 is also connected to the energy converter 213 with an energy guide 215 (e.g. a cooling circuit for the energy converter 213). The hydrogen fed power system 210 as shown is also provided an electric energy storage 216 (battery/supercap system). The pressure converter 212, the energy converter 213 and the electric energy storage 216 are all connected with electric wiring 217 and intermediate DC/DC and/or DC/AC convertors 218 connected to an electric drive motor 219. In the electric wiring 217 are DC and/or AC busses 220 integrated.

The invention claimed is:

1. Hydrogen fed power system comprising:
   a high-pressure hydrogen container,
   at least one hydrogen operated energy converter connecting to the hydrogen container,
   an electrochemical pressure converter for hydrogen gas located between the high-pressure hydrogen container and the hydrogen operated energy converter wherein the hydrogen operated energy converter is a lower pressure energy converter, the electrochemical pressure converter having an ion-conductive membrane configured for conversion of both pressure energy and electric energy, and
   a heat guide connecting the hydrogen operated energy converter to the electrochemical pressure converter.

2. Hydrogen fed power system according to claim 1, characterized in that the electrochemical pressure converter is a de-compressor that generates electrical power by decompression of the hydrogen gas.

3. Hydrogen fed power system according to claim 1 or 2, characterized in that the electrochemical pressure converter is applicable as an electrically driven compressor.

4. Hydrogen fed power system according to claim 1 or 2, characterized in that the electrochemical pressure converter is connected to an electric power storage.

5. Hydrogen fed power system according to claim 1 or 2, characterized in that the hydrogen operated energy converter comprises at least one fuel cell.

6. Hydrogen fed power system according to claim 5, characterized in that the system further comprises an electric drive that is electrically connected to the fuel cell.

7. Hydrogen fed power system according to claim 6, characterized in that the ion-conductive membrane is electrically connected to the electric drive.

8. Hydrogen fed power system according to claim 5, characterized in that fuel cell is a stack of plural fuel cell elements.

9. Hydrogen fed power system according to claim 1 or 2, characterized in that the hydrogen operated energy converter is a hydrogen fed combustion engine.

10. Hydrogen fed power system according to claim 1 or 2, characterized in that the heat guide comprises a fluid circulation system.

11. Hydrogen fed power system according to claim 1 or 2, characterized in that the heat guide connects the hydrogen operated energy converter with thermally conductive fluids to the electrochemical pressure converter.

12. Hydrogen fed power system according to claim 1 or 2, characterized in that the ion-conductive membrane is integrated with the high-pressure hydrogen container.

13. Hydrogen fed power system according to claim 1 or 2, characterized in that the system is provided with control means connecting to the electrochemical pressure converter and the hydrogen operated energy converter.

14. Transportation means provided with a hydrogen fed power system according to claim 1 or 2.

* * * * *